United States Patent
Lee

(10) Patent No.: US 9,075,870 B2
(45) Date of Patent: Jul. 7, 2015

(54) SYSTEM, METHOD AND APPARATUS FOR DETECTING RELATED TOPICS AND COMPETITION TOPICS BASED ON TOPIC TEMPLATES AND ASSOCIATION WORDS

(75) Inventor: Chung Hee Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 228 days.

(21) Appl. No.: 13/612,182

(22) Filed: Sep. 12, 2012

(65) Prior Publication Data

US 2013/0090918 A1     Apr. 11, 2013

(30) Foreign Application Priority Data

Oct. 7, 2011   (KR) ........................ 10-2011-0102569

(51) Int. Cl.

| G06F 17/21 | (2006.01) |
|---|---|
| G06F 17/27 | (2006.01) |
| G06F 17/20 | (2006.01) |
| G06F 17/30 | (2006.01) |

(52) U.S. Cl.
CPC ................ G06F 17/30705 (2013.01)

(58) Field of Classification Search
USPC .............. 704/1, 9, 10; 707/708, 709
See application file for complete search history.

(56) References Cited

U.S. PATENT DOCUMENTS

| 5,794,193 | A | * | 8/1998 | Gorin ............................ 704/250 |
|---|---|---|---|---|
| 6,529,902 | B1 | | 3/2003 | Kanevsky et al. |
| 7,395,256 | B2 | * | 7/2008 | Ji et al. ......................... 707/737 |
| 7,426,507 | B1 | * | 9/2008 | Patterson ............................ 1/1 |
| 8,209,335 | B2 | * | 6/2012 | Novak ......................... 707/748 |
| 2003/0217335 | A1 | * | 11/2003 | Chung et al. .................. 715/514 |
| 2010/0191747 | A1 | | 7/2010 | Ji et al. |
| 2010/0205541 | A1 | * | 8/2010 | Rapaport et al. .............. 715/753 |
| 2011/0282874 | A1 | * | 11/2011 | Xu et al. ....................... 707/737 |

FOREIGN PATENT DOCUMENTS

| JP | 2008-027207 | 2/2008 |
|---|---|---|
| KR | 10-2010-0088002 | 8/2010 |
| KR | 10-2010-0103001 | 9/2010 |
| KR | 10-2010-0105226 | 9/2010 |

OTHER PUBLICATIONS

Weiwei Cui et al., "Context Preserving Dynamic Word Cloud Visualization", IEEE Pacific Visualization Symposium 2010 IEEE, Mar. 2-5, 2010, Taipei, Taiwan, pp. 121-128.
Michael Mathioudakis et al., "TwitterMonitor: Trend Detection over the Twitter Stream", Proceeding of the 2010 ACM SIGMOD International Conference on Management of data, pp. 1155-1158.

(Continued)

*Primary Examiner* — Jesse Pullias
(74) *Attorney, Agent, or Firm* — Staas & Halsey LLP

(57) ABSTRACT

A system for detecting related topics and competition topics for a target topic includes an information extracting apparatus configured to create topic templates and association words from documents created online to generate topic templates and association words. The system also includes a related topic detecting apparatus configured to detect and trace related topics and competition topics for the target topic based on the topic templates and the association words.

19 Claims, 11 Drawing Sheets

(56) References Cited

OTHER PUBLICATIONS

Takeshi Sakaki et al., "Earthquake Shakes Twitter Users: Real—time Event Detection by Social Sensors", Proceedings of the 19th International Conference on World Wide Web, 2010, pp. 851-860.

Heung-Seon Oh et al., "Trend Properties and a Ranking Method for Automatic Trend Analysis", Journal of Korean Institute of Information Scientist and Engineers; Software and Applications, vol. 36, No. 3, Mar. 2009.

* cited by examiner

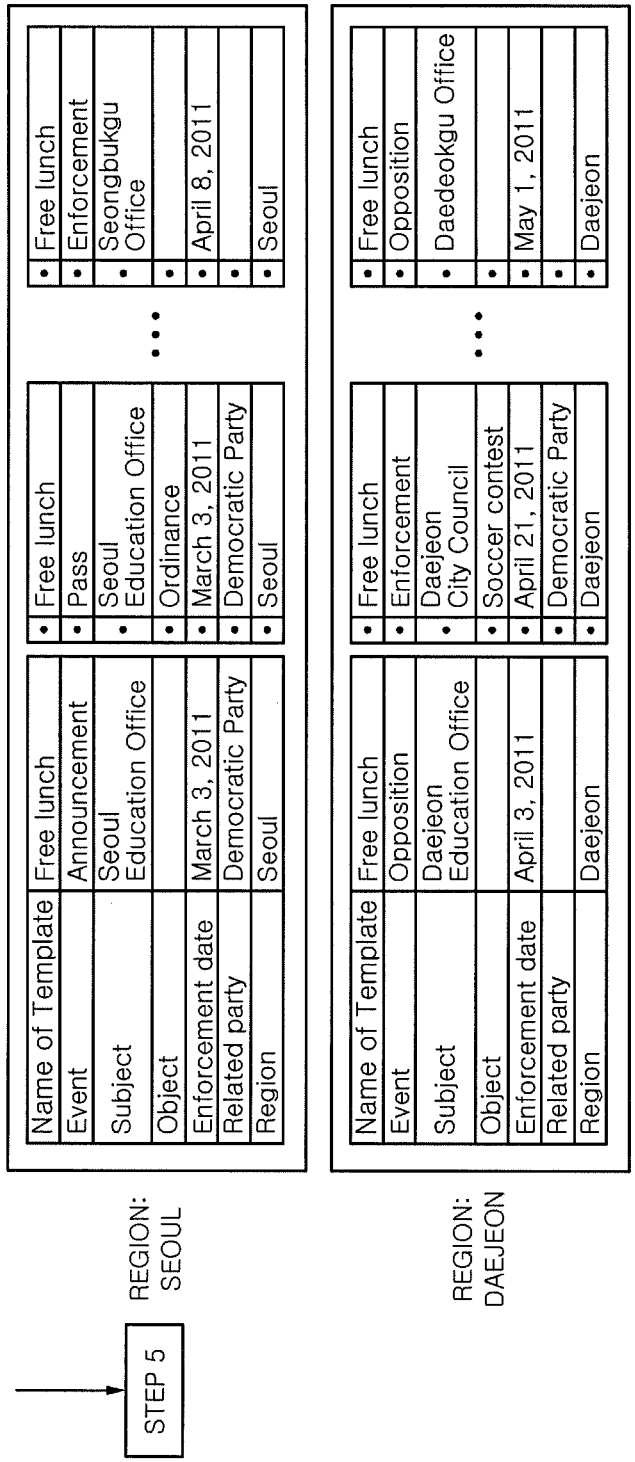

SYSTEM, METHOD AND APPARATUS FOR DETECTING RELATED TOPICS AND COMPETITION TOPICS BASED ON TOPIC TEMPLATES AND ASSOCIATION WORDS

CROSS-REFERENCE(S) TO RELATED APPLICATION(S)

This application claims the benefit of Korean Patent Application No. 10-2011-0102569, filed on Oct. 7, 2011, which is hereby incorporated by reference as if fully set forth herein.

FIELD OF THE INVENTION

The present invention relates to a topic detecting and tracing technology, and more particularly, to a system, method and apparatus for automatically detecting and tracing related topics and competition topics for a specific topic based on topic templates and association words.

BACKGROUND OF THE INVENTION

There exist some methods for dealing with a related topic detecting and tracing technology.

For example, Korean Unexamined Patent Publication No. 2010-0105226 discloses a system and method for issue tracking and management, which effectively and efficiently processes business issues or problems that are generated in an organization such as an enterprise, a research institute, or the like.

As problems generated in a workplace become gradually complicated and diverse, it requires considerable early corresponding time to recognize the causes of the problems and to establish a solution thereto and it is difficult to determine an optimal solution for the problems without real time inter-department cooperation and cross-checking. In order to overcome the above disadvantages, the system and method for issue tracking and management has been proposed in the related art. The method includes proposing and disseminating an issue, searching similar issues, establishing alternatives and exchanging opinions in order to resolve the issue, and registering the processing result of the resolved issue.

This Korean patent publication provides to create tools that help a user propose an issue and directly search related examples or the like so that the user may easily resolve the issue.

Korean Unexamined Patent Publication No. 2009-0021350 presents an issue analyzing system and an issue data generation method, and more particularly, presents an issue analyzing system for extracting information included in input data to analyze an issue set by a user and to manage the analyzed issue and a method of generating issue analyzing data for issue analysis from various input data using the same.

The object of this Publication is to help automatically extracting a core word, a core image, metadata, and the like from various documents to search the issue input by the user.

U.S. Pat. No. 6,529,902, issued on Mar. 4, 2003 and entitled "method and system for off-line detection of textual topical changes and topic identification via likelihood based methods for improved language modeling", provides an off-line segmentation of textual data that uses change-point methods, 2) to perform off-line topic identification of textual data, and 3) to provide an improved language modeling for off-line automatic speech decoding and machine translation. Specifically, a document is divided into segments of a specific size, a likelihood score is calculated for each segment to calculate a likelihood ratio, and a corresponding topic is assigned while dividing the document into segments when the likelihood ratio is greater than a threshold, indicating that a topic is converted.

The object of this patent is to correctly convert and assign a topic in a document based on a likelihood method.

Heung-seon Oh, Yunjeong Choi, Wookhyun Shin, Yoonjae Jeong, and Seong-hyon Myaeng, discloses "Trend Properties and a Ranking Method for Automatic Trend Analysis", Information Science Academy Thesis: Software and Application, 2009. This thesis provides a method of defining four properties (variability, continuity, stability, and accumulation amount) from a trend curve composed of appearance frequencies and of determining the order of the trends using the same in order to quantify various aspects of trends.

Most of past researches on automatically analyzing trends from documents having time information such as patents, news, and blogs are focused on measuring the importance of given concept using appearance frequency information on words related to trends and on showing a trend line of the concept with time.

In the above thesis, utility of the respective properties is verified and it is analyzed which influence the combination of the properties has on determining the order through a series of experiments. It can be seen from the experiment results that it is easier to detect a specific trend when all of the four properties are combined with each other.

The object of this thesis is to better detect the trend. In the thesis, a method of determining the order of trends based on four properties is presented.

Michael Mathioudakis and Nick Koudas discloses "Twitter Monitor: Trend Detection over the Twitter Stream", SIGMOD 2010. This thesis presents a system for detecting trends for Twitter stream analyzes Twitter in real time, which detects emerging topics based on the number of frequencies of a keyword, integrates related information on the respective topics, and provides a meaningful analysis result. The object of this thesis is to present a method of detecting the emerging topics as recent trends simply based on the number of frequencies of the keyword on recently frequently used Twitter.

Takeshi Sakaki, Makoto Okazaki, and Yutaka Matsuo, discloses "Earthquake Shakes Twitter Users: Real-time Event Detection by Social Sensors", WWW 2010. This thesis relates to a method of detecting an accident such as earthquake in real time for tweet created on Twitter to trace the accident. A classifier in which a keyword and context information on tweet are used as features is used in order to detect a target accident and a time-space probability model by which the center of the place and the movement route of the target accident may be found is developed. According to the above system, it was possible to determine whether 96% of earthquake with magnitude 3 or more was generated in Japan from Twitter, to estimate the movement route of earthquake or typhoon, and to inform a target area of the movement route of earthquake or typhoon faster than the weather center.

The object of this thesis is to monitor Twitter in real time and to rapidly detect and inform an accident such as natural disaster or the like.

However, the methods for dealing with a related topic detecting and tracing technology are limited to detect a specific topic or trend itself. It is, therefore, not possible to automatically find topics in competition with a specific topic and to automatically find contents that the specific topic is associated and complexly mixed with other topics to spread out. Thus, when a user wishes to find competition topics or related topics to the specific topic to see a complex relationship between the topics, the user needs to directly search these topics.

SUMMARY OF THE INVENTION

In view of the above, therefore, the present invention provides a system and method capable of automatically detecting and tracing related topics and competition topics of a specific topic based on topic templates and association words, unlike simply finding and managing a topic or a trend itself.

Embodiments of the present invention relate to a system for detecting related topics and competition topics for a target topic, an apparatus for detecting and tracing related topics and competition topics for a target topic, and a method for detecting and tracing related topics and competition topics for a target topic.

In the embodiments, a system for detecting related topics and competition topics for a target topic includes: an information extracting apparatus configured to create topic templates and association words from documents created online to generate topic templates and association words; and a related topic detecting apparatus configured to detect and trace related topics and competition topics for the target topic based on the topic templates and the association words.

In the embodiments, the information extracting apparatus includes: a language analyzing unit configured to perform a language analysis on the documents through analyzing morphemes and recognizing named-entities; a topic template extracting unit configured to extract topics from the documents to generate the topic templates for the topics using the language analyzed results; a topic ranking unit configured to measure frequencies, importance, and reliabilities of the topics to rank the topics; and an association word extracting unit configured to measure the degrees of association among keywords within the topics to extract the association words with highly associated keywords based on the measured degrees of relation.

In the embodiments, the documents include at least one of news, blogs, and social network services (SNS).

In the embodiments, an apparatus for detecting and tracing related topics and competition topics for a target topic includes: a topic template property based related topic detecting unit configured to recognize a type of the target topic to detect and trace related topics appropriate to the target topic based on the properties of topic templates; an association word based competition topic detecting unit configured to filter and rank association words of the target topic based on the properties of the topic templates to extract competition topics in competition with the target topic, and search the topic templates for the extracted competition topics and the target topic to provide topic tracing results; and an association word based related topic detecting unit configured to rank topics that are related to the target topic and that become issues among the association words of the target topic.

In the embodiments, the topic template property based related topic detecting unit includes: a topic type recognizing unit configured to select the type of the target topic as one of preset topic types; a topic type core property selecting unit configured to select a core property of the target topic depending on the topic type selected by the topic type recognizing unit; and a related topic searching unit configured to search topic templates based on the core property selected by the topic type core property selecting unit and the target topic to find the related topics to the target topic.

In the embodiments, the core property is selected using a preset rule or machine learning technique.

In the embodiments, the association word based competition topic detecting unit includes: an association word searching unit configured to search association words of the target topic; an association word filtering unit configured to filter out topics that are different from the competition topics of the target topic among the searched association words by the association word searching unit;

a competition topic ranking unit configured to rank the association words filtered by the association word filtering unit using frequency and source reliability measurements to select a first ranked competition topic; a competition topic searching unit configured to search the topic templates to find related topics to the first ranked competition topic; a target topic searching unit configured to search the topic templates to find related topics to the target topic; and a topic tracing unit configured to providing the related topics searched by the competition topic searching unit and the related topics searched by the target topic searching unit through a user interface.

In the embodiments, the association word filtering unit filters out topics that are different from the competition topics in consideration of topic template property values of the topic template or named-entity tags based on preset removing rules.

In the embodiments, the association word based related topic detecting unit includes: an association word searching unit configured to searching association words of the target topic; an association word based topic template searching unit configured to searching association words and related topics based on the search results of the association word searching unit; a target topic based filtering unit configured to removing topics that are not related to the target topic from among the search results of the association word based topic template searching unit;

a topic ranking unit configured to measuring degrees of being issues for topics left after being filtered by the target topic based filtering unit to rank the topics by date; and a related topic presenting unit configured to provide topics that become issues through a user interface based on ranking results by date that are obtained by the topic ranking unit.

In the embodiments, the target topic based filtering unit removes topics that are not related to the target topic based on the association word and the property values of the topic templates.

In the embodiments, a method for detecting and tracing related topics and competition topics for a target topic includes: recognizing a type of the target topic to detect and trace related topics appropriate to the target topic based on the properties of topic templates; filtering association words of the target topic based on the properties of the topic templates to extract competition topics of the target topic; searching the topic templates for the extracted competition topics and the target topic to provide topic tracing results; and ranking topics that are related to the target topic and that become issues among the association words of the target topic.

In the embodiments, the recognizing a type of the target topic includes: selecting the type of the target topic as one of preset topic types; selecting a core property of the target topic depending on the selected topic type; and searching the topic templates to find related topics to the target topic based on the selected core property and the target topic.

In the embodiments, the searching the topic templates includes: searching all topic templates having the same names as the target topic; eliminating topic templates whose core properties do not have property values; ranking the property values to select upper N-number of property values; eliminating topic templates except the topic templates having the upper N-number of property values; and grouping the topic templates based on the upper N-number of property values.

In the embodiments, the selecting a core property of the target topic includes selecting the core property by a preset rule or machine learning technique.

In the embodiments, the searching all topic templates includes: searching association words of the target topic; filtering out topics that are not included in the competition topics of the target topic from among the association word search results; ranking the filtered association words using frequency and source reliability measurements to select a first ranked competition topic; searching the topic templates to find related topics to the first ranked competition topic; searching the topic templates to find related topics to the target topic; and providing search results for the first ranked competition topic and search results for the target topic through a user interface.

In the embodiments, the filtering out topics that are not included in the competition topics of the target topic includes removing topics that are different from the competition topics in consideration of property values of the topic template or named-entity tags based on preset removing rules.

In the embodiments, the preset removing rules are implemented to: remove association words whose named-entity tags are different from the target topic based on the named-entity tags; select a filtering property by the type of the target topic to choose a property to be filtered in dependence on the type of the target topic; search the topic templates for the association words; and remove association words whose filtering property values are the same as the filtering property value of the target topic.

In the embodiments, the ranking topics includes: searching association words of the target topic; searching related topics to the association words; filtering out topics that are not related to the target topic from among the searched association words; measuring degrees of being issues for the filtered topics to rank the filtered topics by date; and providing the topics through a user interface based on ranking results obtained by date.

In the embodiments, the filtering out topics includes removing the topics that are not related to the target topic based on the association words and the property value of the topic templates.

BRIEF DESCRIPTION OF THE DRAWINGS

The above and other objects and features of the present invention will become apparent from the following description of preferred embodiments, given in conjunction with the accompanying drawings, in which:

FIGS. 4A and 4B illustrate a diagram illustrating processes of realizing a topic template searched by a related topic searching unit based on a core property selected by the topic type core property selecting unit of FIG. 2 and a target topic;

DETAILED DESCRIPTION OF THE EMBODIMENTS

Hereinafter, a technology of detecting related topics and competition topics based on topic templates and association words in accordance with an embodiment of the present invention will be described in detail with reference to the accompanying drawings.

The present invention relates to a technology of automatically detecting and tracing related topics and completion topics for a specific topic. The extracted related topics and competition topics are detected based on topic templates and association words. Specifically, the inventive technology may include the steps of detecting the related topics based on topic template properties, of detecting the competition topics based on association words, of detecting the related topics based on the association words, and the like.

Topics transmitted among users online through news, blogs, social network services (SNS) or the like are stored in the form of templates through an information extracting step. Keywords related to each other are stored as association words. Based on the above, the competition topics and the related topics are automatically detected and traced, so that it is possible to correctly and minutely analyze topics that recently become issues, to previously analyze a topic that may matter before the topic becomes an issue, and to cope with the topic. In accordance with the present invention, a topic is defined to encompass both of Entity and Entity+Event, and Event may include an action. For example, the above is as follows.

Entity: iPad, Galaxy S, and free lunch

Entity+Event: <iPad, launch>, and <free lunch, opposition>

A topic template may include a property and a property value structure and may be configured to have the form as illustrated in Table 1, Table 2 and Table 3 below.

TABLE 1

| Name of template | iMac refresh |
|---|---|
| Event | Launch |
| Topic | Apple Inc. |
| Object | |
| Manufacturer | Apple Inc. |
| Launch date | May 10, 2011 |
| Frequency | 120 |

TABLE 2

| Name of template | iPhone 5 |
|---|---|
| Event | Generation |
| Topic | Recall |
| Object | |
| Manufacturer | Apple Inc. |
| Launch date | Jun. 20, 2011 |
| Frequency | 14 |

TABLE 3

| Name of template | Free lunch |
|---|---|
| Event | Announcement |
| Topic | Seoul Education Office |
| Object | |
| Manufacturer | Democratic party |
| Launch date | May 12, 2011 |
| Frequency | 52 |

Figure 1:
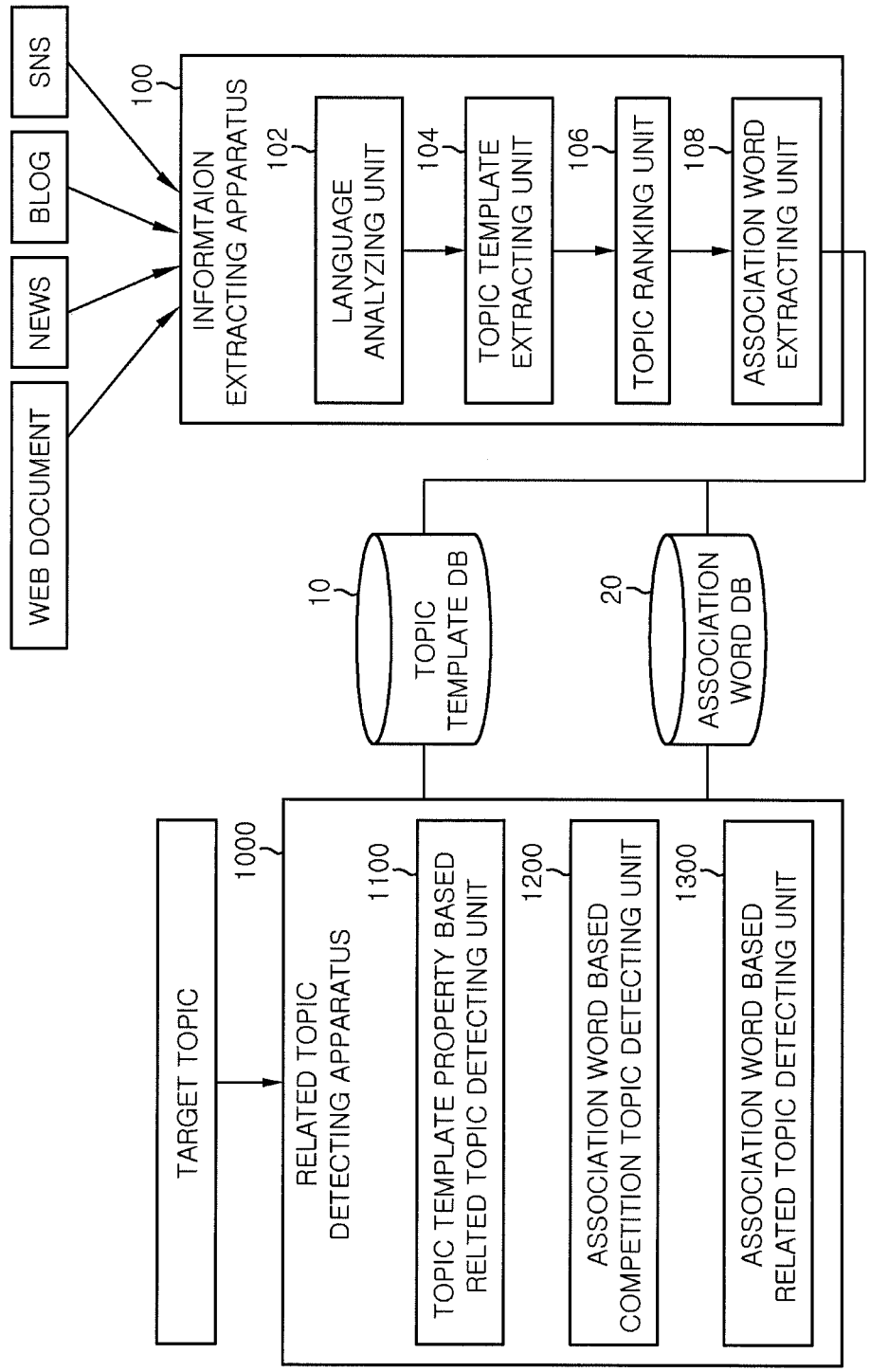
FIG. 1 illustrates a block diagram of a system for detecting related topics and completion topics including an apparatus for detecting related topics and completion topics based on topic templates and association words in accordance with an embodiment of the present invention.

Referring now FIG. 1, there is illustrated a block diagram showing the configuration of an overall system for detecting related topics and completion topics based on topic templates and association words in accordance with the present invention. The system of the embodiment generally includes an information extracting apparatus 100 and a related topic detecting apparatus 1000.

The information extracting apparatus 100 serves to receive documents generated online such as news, blogs, SNS (Social Network Service) or the like to finally generate topic templates and association words using an information extracting technology. The topic templates generated by the information extracting apparatus 100 are stored in a topic template database (DB) 10, and the association words are stored in an association word DB 20. The information extracting apparatus 100 includes a language analyzing unit 102, a topic template extracting unit 104, a topic ranking unit 106, and an association word extracting unit 108.

The language analyzing unit 102 performs a language analysis such as analyzing a morpheme, recognizing a named-entity or the like on the documents.

The topic template extracting unit 104 extracts topics from the documents using a language analysis result obtained by the language analyzing unit 102 and stores topic template for the extracted topics in the topic template DB 10. The topic ranking unit 106 measures frequencies, importance, and reliabilities of the topics of the topic templates to determine the raking of the topics.

The association word extracting unit 108 measures the degree of association among keywords within the topics to extract highly associated keywords as association words. The association words extracted by the association word extracting unit 108 are stored in the association word DB 20.

Meanwhile, the related topic detecting apparatus 1000 automatically detects and traces related topics and competition topics for a target topic input by a user based on DB information, i.e., the topic templates and the association words, generated by the information extracting apparatus 100 to show the related topics and the competition topics. The related topic detecting apparatus 1000 includes a topic template property based related topic detecting unit 1100, an association word based competition topic detecting unit 1200, and an association word based related topic detecting unit 1300.

The topic template property based related topic detecting unit 1100 recognizes the type of the target topic input by the user to detect and trace the related topics appropriate to the target topic based on the properties of the topic templates.

The association word based competition topic detecting unit 1200 filters and ranks the association words of the target topic, through the use of a rule and machine learning method, based on the property of the topic template DB 10 to extract competition topics in competition with the target topic. Further, the association word based competition topic detecting unit 1200 searches the topic template DB 10 for the extracted competition topics and the target topic to provide a topic tracing result.

The association word based related topic detecting unit 1300 ranks topics that are related to the target topic and that become issues among the association words of the target topic.

Figure 2:
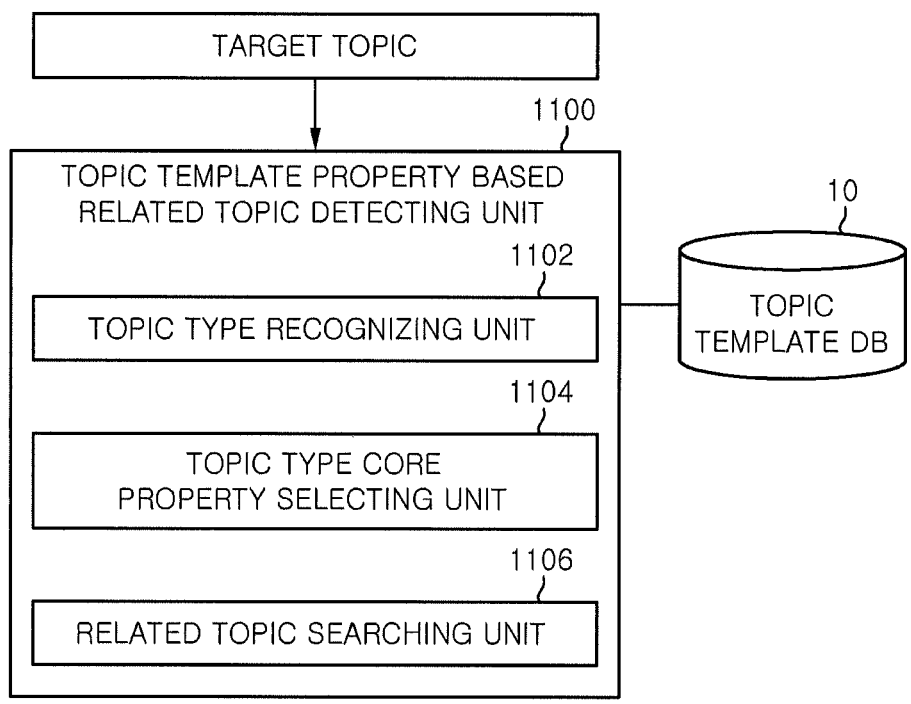
FIG. 2 illustrates a detailed block diagram of the topic template property based related topic detecting unit in the related topic detecting apparatus of FIG. 1.

FIG. 2 illustrates a detailed block diagram of the topic template property based related topic detecting unit 1100 of FIG. 1. The topic template property based related topic detecting unit 110 includes a topic type recognizing unit 1102, a topic type core property selecting unit 1104, a related topic searching unit 1106, and a related topic presenting unit 1108.

The topic type recognizing unit 1102 selects any one of preset topic types suitable to the target topic.

Figure 3:
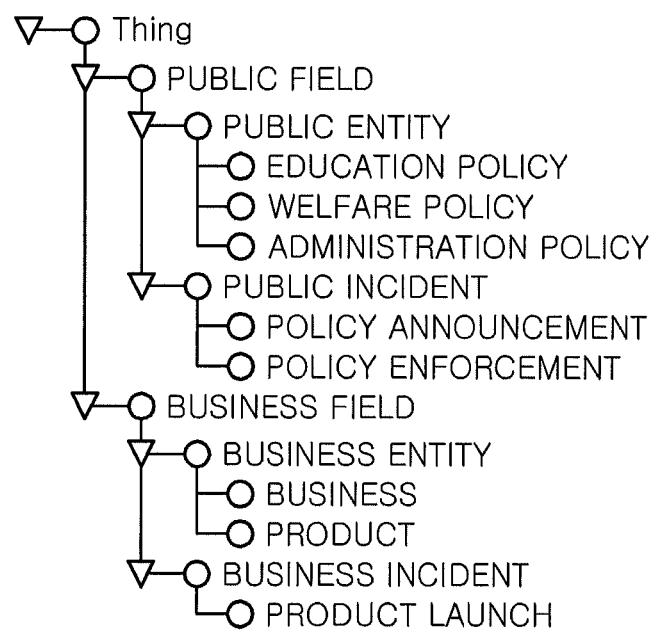
FIG. 3 is a view illustrating a hierarchical structure of a topic type recognized by the topic template recognizing unit of FIG. 2.

A topic type may have the hierarchical structure illustrated in FIG. 3. In this regard, it is understood that the topic type hierarchy illustrated in FIG. 3 is merely an example, and it will be appreciated by those skilled in the art that the topic type hierarchy may vary based on a classifying method.

The topic type core property selecting unit 1104 serves to select the most effective property, i.e., the core property, for finding topics related to the target topic. The topic type core property selecting unit 1104 may present a core property of the target topic based on the topic type presented by the topic type recognizing unit 1102.

In an embodiment, various rules or machine learning methods may be applied to selecting core properties and are not limited to a specific method. The core properties individually selected for the topic type may be illustrated as follows:

TABLE 4

| Topic type | Core property |
|---|---|
| welfare policy | region |
| welfare policy | party |
| product-smart phone | sales country |
| product-book | age |
| . . . | . . . |

The related topic searching unit 1106 serves to search topic templates based on the core properties selected by the topic type core property selecting unit 1104 and the target topic and performs the following search steps:

Step 1: Search all topic templates having the names as the target topic.

Step 2: Remove topic templates in which the values of core properties are empty, i.e., eliminate topic templates whose core properties do not have property values.

Step 3: Rank property values and select upper N-number of property values.

Step 4: Eliminate topic templates except the topic templates having the upper N-number of property values.

Step 5: Group the topic templates based on the upper N-number of property values.

Figure 4A:
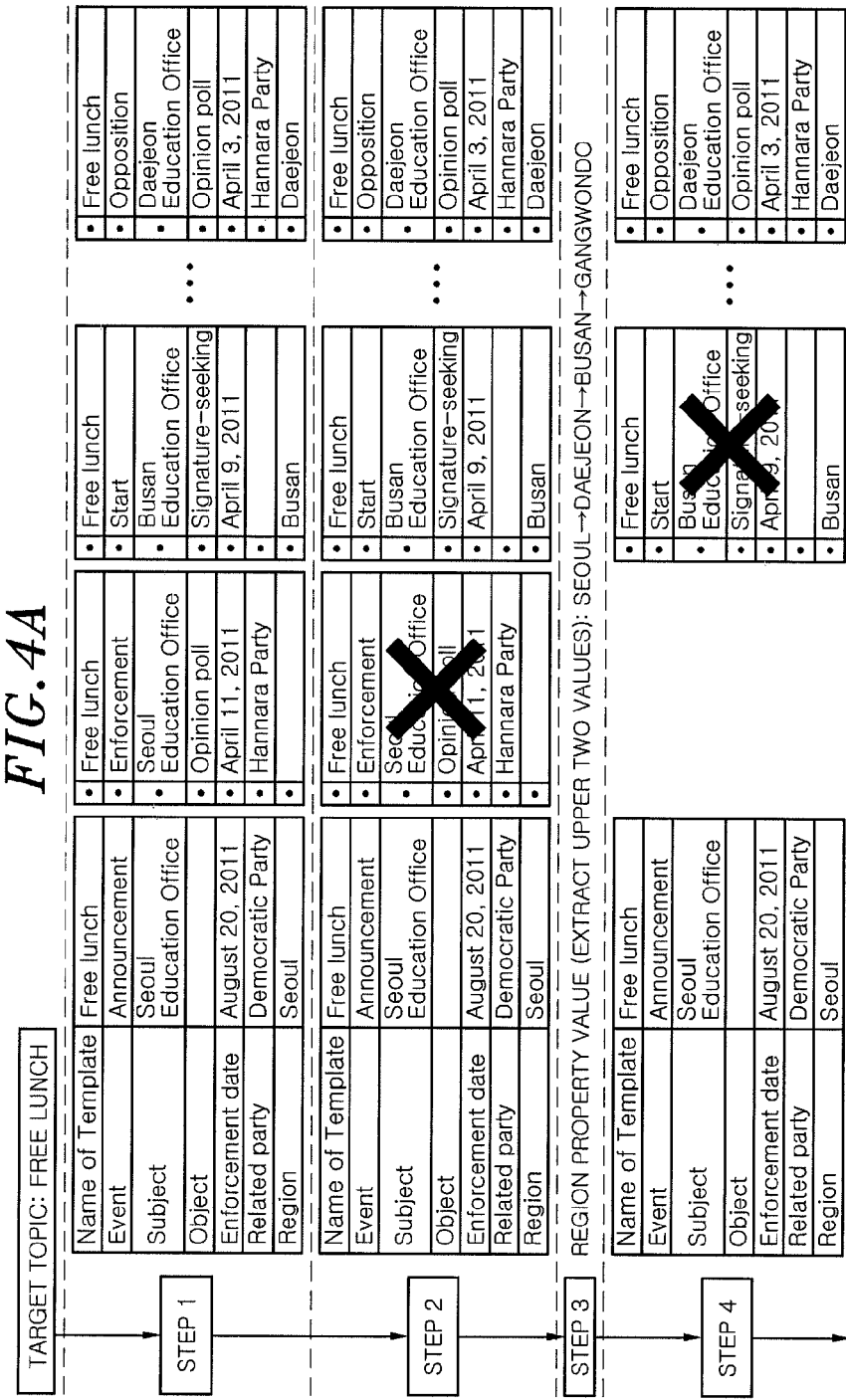

FIGS. 4A and 4B illustrate a stepwise procedure of searching the topic templates performed by the related topic searching unit 1106 based on the core property selected by the topic type core property selecting unit 1104 of FIG. 2 and the target topic.

In FIGS. 4A and 4B, it is assumed that a target topic is 'Free Lunch' and that the core property selected by the topic type core property selecting unit 1104 is 'Region'.

Figure 5:
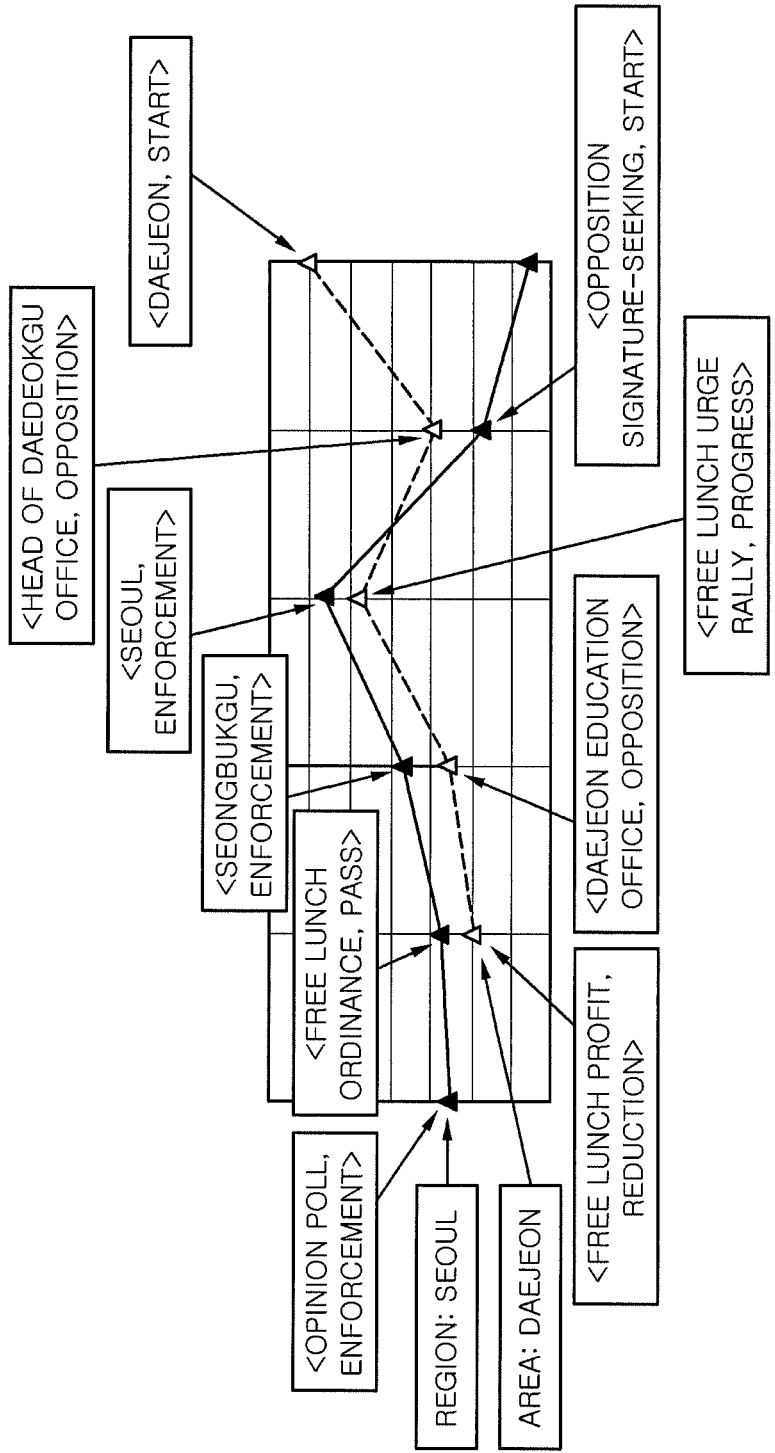
FIG. 5 is a view illustrating a related topic presenting result presented by the related topic presenting unit of FIG. 2.

The related topic presenting unit 1104 displays the topics searched by the related topic searching unit 1106 depending on time and importance. Related topics presented by the related topic presenting unit 1104 are as illustrated in FIG. 5 in which a target topic is 'Free Lunch'.

Figure 6:
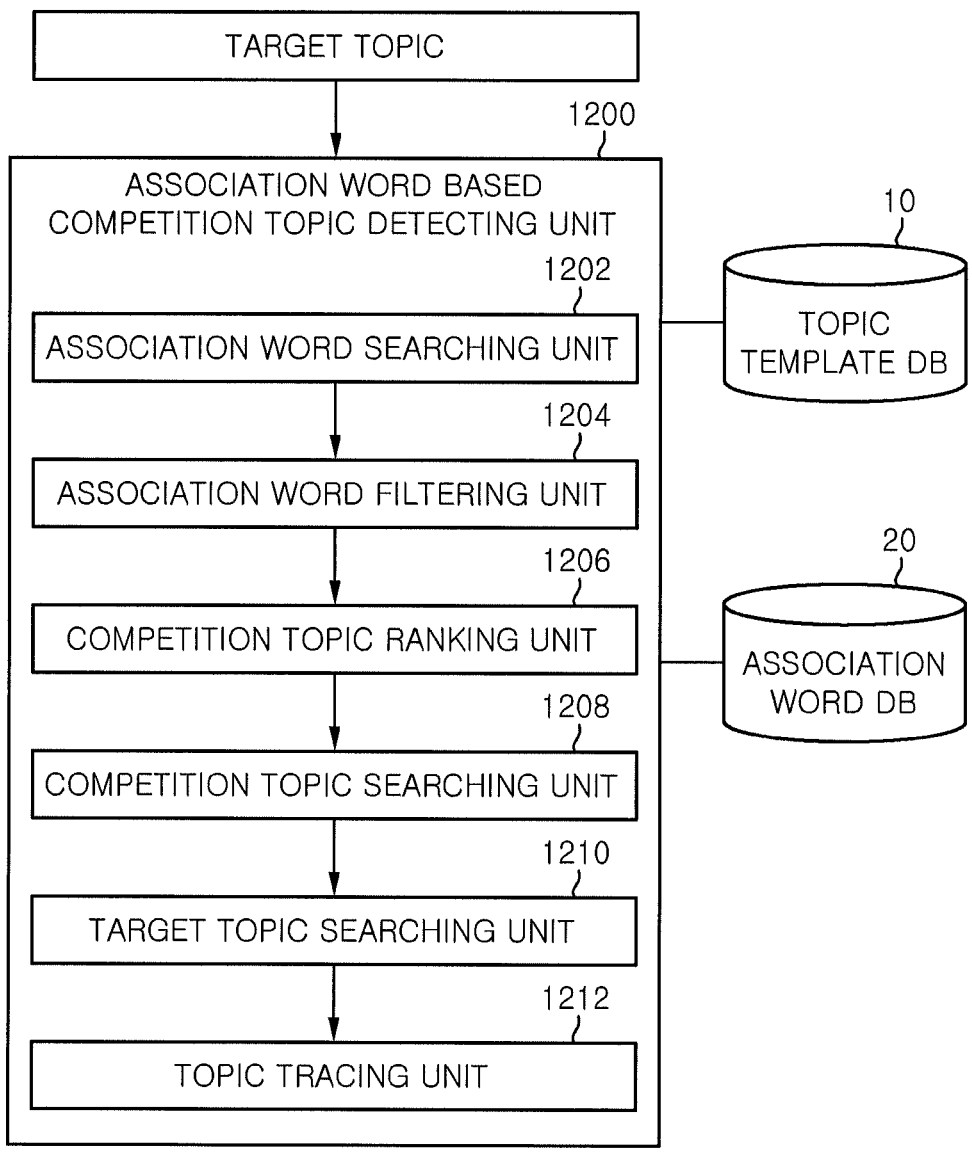
FIG. 6 illustrates a detailed block diagram of the association word based competition topic detecting unit of FIG. 1.

FIG. 6 illustrates a detailed block diagram of the association word based competition topic detecting unit 1200 of FIG.

1. The association word based competition topic detecting unit 1200 includes an association word searching unit 1202, an association word filtering unit 1204, a competition topic ranking unit 1206, a competition topic searching unit 1208, a target topic searching unit 1210, and a topic tracing unit 1212.

The association word searching unit 1202 searches the association words for the target topic based on the association word DB 20. The search may be performed as follows:
Target topic: iPad
Association word search results: Steve Jobs, Motorola Zoom, iPhone, Galaxy Tab, Apple The association word filtering unit 1204 filters out topics that are not included in or different from the competition topics of the target topic from among the association word search results. For example, the topics that are different from the competition topics are removed in consideration of topic template property values, named-entity tags and the like based on preset removing rules. The removing rules may be implemented as follows:
Step 1: Perform filtering based on named-entity tags
Function: Remove association words whose named-entity tags are different from the named-entity tag of the target topic
Instance
Named-entity tag of target topic: <iPad: TMI_HW>
Named-entity tags for association words: <Steve Jobs: PS_PERSON>, <Motorola Zoom: TMI_HW>, <iPhone: TMI_HW>, <Galaxy Tab: TMI_HW>, and <Apple: OGG_BUSINESS>
Filtering results: Motorola Zoom, iPhone, and Galaxy Tab
Step 2: Select a filtering property for target topic type
Function: Select a property to be filtered based on the type of the target topic
Instance
Target topic type (for example: iPad): product-tablet PC
Filtering property: manufacturer
Step 3: Remove association words based on topic template property
Function: Search respective association words from topic templates and delete an association word whose filtering property value is the same as the filtering property value of a target topic
Instance
Filtering property value of a target topic: <iPad, manufacturer: Apple>
Filtering property values for each association word: <Motorola Zoom, manufacturer: Motorola>, <iPhone, manufacturer: Apple>, and <Galaxy Tab, manufacturer: Samsung>
Filtering results: Motorola Zoom and Galaxy Tab The competition topic ranking unit 1206 ranks the filtered association words using frequencies and source reliability measurements and finally selects one competition topic. When it is assumed that Galaxy Tab ranks first as a result of ranking in the above instance, Galaxy Tab is selected as a final competition topic.

The competition topic searching unit 1208 searches topic templates for all the related topics on an entity of the final competition topic.

The target topic searching unit 1210 searches topic templates for all the related topics on an entity of the target topic.

The topic tracing unit 1212 displays the search results of the competition topic searching unit 1208 and the search results of the target topic searching unit 1210 through a user interface (UI), which allows providing an easy comparison.

Figure 7A:
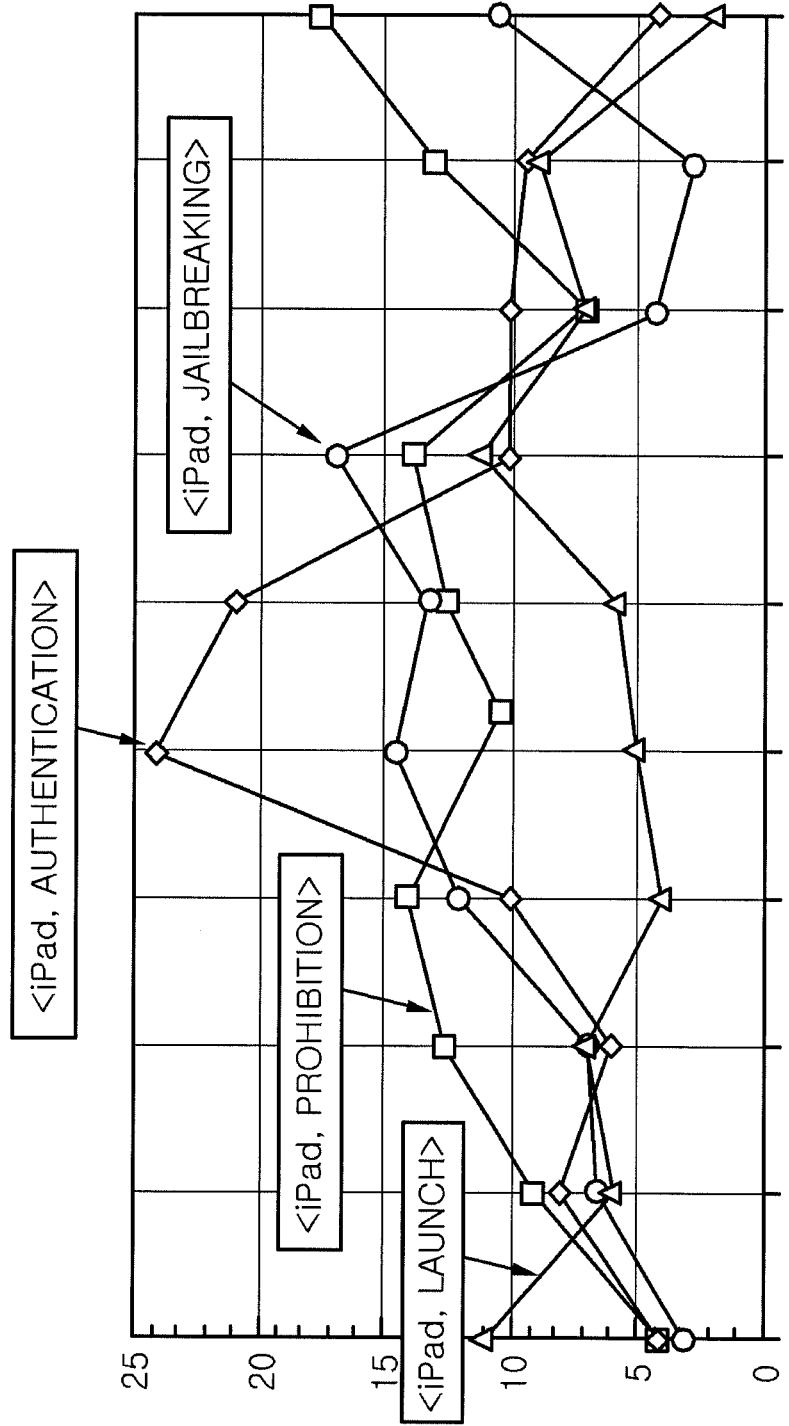
FIGS. 7A and 7B illustrate output results provided by the topic tracing unit of FIG. 6.
Figure 7B:
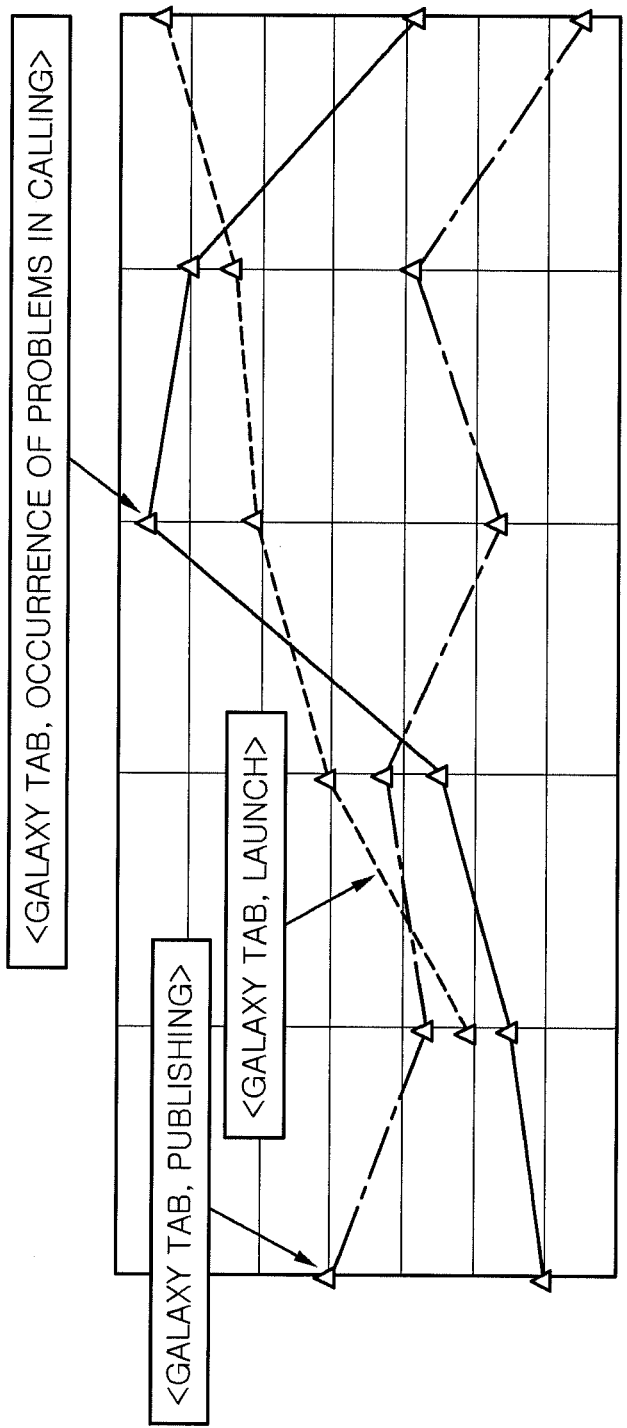

For example, FIGS. 7A and 7B illustrate output results, i.e., target topic tracing UI for iPAD and competition topic tracing UI for GALAXY TAB, provided by the topic tracing unit 1212, respectively.

Figure 8:
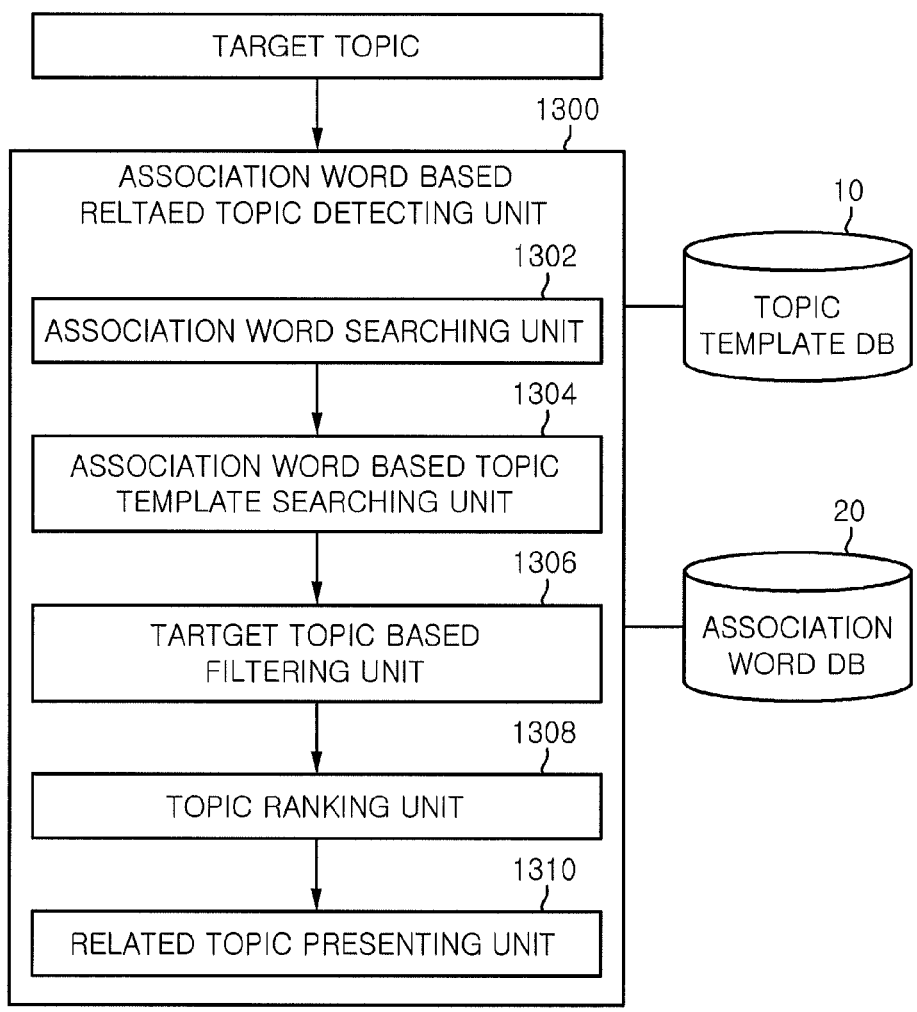
FIG. 8 illustrates a detailed block diagram of the association word based related topic detecting unit of FIG. 1.

FIG. 8 illustrates a detailed block diagram of the association word based related topic detecting unit 1300 of FIG. 1. The association word based related topic detecting unit 1300 includes an association word searching unit 1302, an association word based topic template searching unit 1304, a target topic based filtering unit 1306, a topic ranking unit 1308, a related topic presenting unit 1310, and the like.

The association word searching unit 1302 searches association words of a target topic for documents generated online, and the search may be performed as follows:
Target topic: four-river restoration project
Association word search results: Nakdong-river, Nation's Transport, Price of vegetables, Grand National Party-Hannara, and Waegwan railway bridge The association word based topic template searching unit 1304 searches all of the topics related to the association words that are the results obtained from the association word searching unit 1302. The examples of the association words and the partial examples of the searched topics are illustrated as follows:
Association word 1: Nakdong-river
Related topics: <cofferdam, collapse>, <ecological park, manage>, <waste, landfill>, and <epidemic stomatitis burial land, start of disaster>
Association word 2: Nation's Transport
Related topics: <Dongnam Distribution New Airport, announcement>, <speed battle, progress>, and <hostess bar regalement, offer>
Association word 3: value of vegetables
Related topics: <price of vegetables, soar>, <government measures, expectation>, and <measure urging statement, announcement>
Association word 4: Waegwan railway bridge
Related topics: <Waegwan railway bridge, facelift>, <recommended value of dioxin, excess>, and <Waegwan railway bridge, collapse>
Association word 5: Grand National Party-Hannara
Related topics: <Ki-yeong Eom, accession to the Party>, <by-election, crushing defeat>, <workers who died during the four-river restoration project, investigation>, and <four-river restoration project, criticism>

The target topic based filtering unit 1306 deletes topics that are not related to the target topic from among the search results obtained from the association word based topic template searching unit 1304. The deleting method of the target topic based filtering unit 1306 may be performed based on the association word DB 20 and topic template properties, as follows:
Association word 1: Nakdong-river
Related topics: <cofferdam, collapse>, <waste, landfill>, and <epidemic stomatitis burial land, start of disaster>
Association word 2: Nation's Transport Related topics: <speed battle, progress> and <hostess bar regalement, offer>
Association word 3: value of vegetables
Related topics: <value of vegetables, soar>
Association word 4: Waegwan railway bridge
Related topics: <Waegwan railway bridge, collapse>
Association word 5: Grand National Party-Hannara
Related topics: <workers who died during the four-river restoration project, investigation>, and <four-river restoration project, criticism>

In the embodiment, the striked-out text such as denotes that an item of the text is deleted using a deleting line.

The topic ranking unit 1308 measures the degrees of becoming issues of remaining topics filtered by the target topic based filtering unit 1306 to rank the topics by date.

The ranking results by date may be represented as follows:
2011
- Third week of January: <price of vegetables, soar> (price of vegetables)
- First week of February: <speed battle, progress> (Nation's Transport)→<waste, landfill> (Nakdong-river)
- Third week of April: <workers who died during the four-river restoration project, investigation> (Grand National Party-Hannara)→<four-river restoration project, criticism> (Grand National Party-Hannara)
- Third week of May: <cofferdam, collapse> (Nakdong-river)
- Third week of June: <hostess bar regalement, offer> (Nation's Transport)
- Fourth week of June: <Waegwan railway bridge, collapse> (Waegwan railway bridge)→<epidemic stomatitis burial land, start of disaster> (Nakdong-river)

Figure 9:
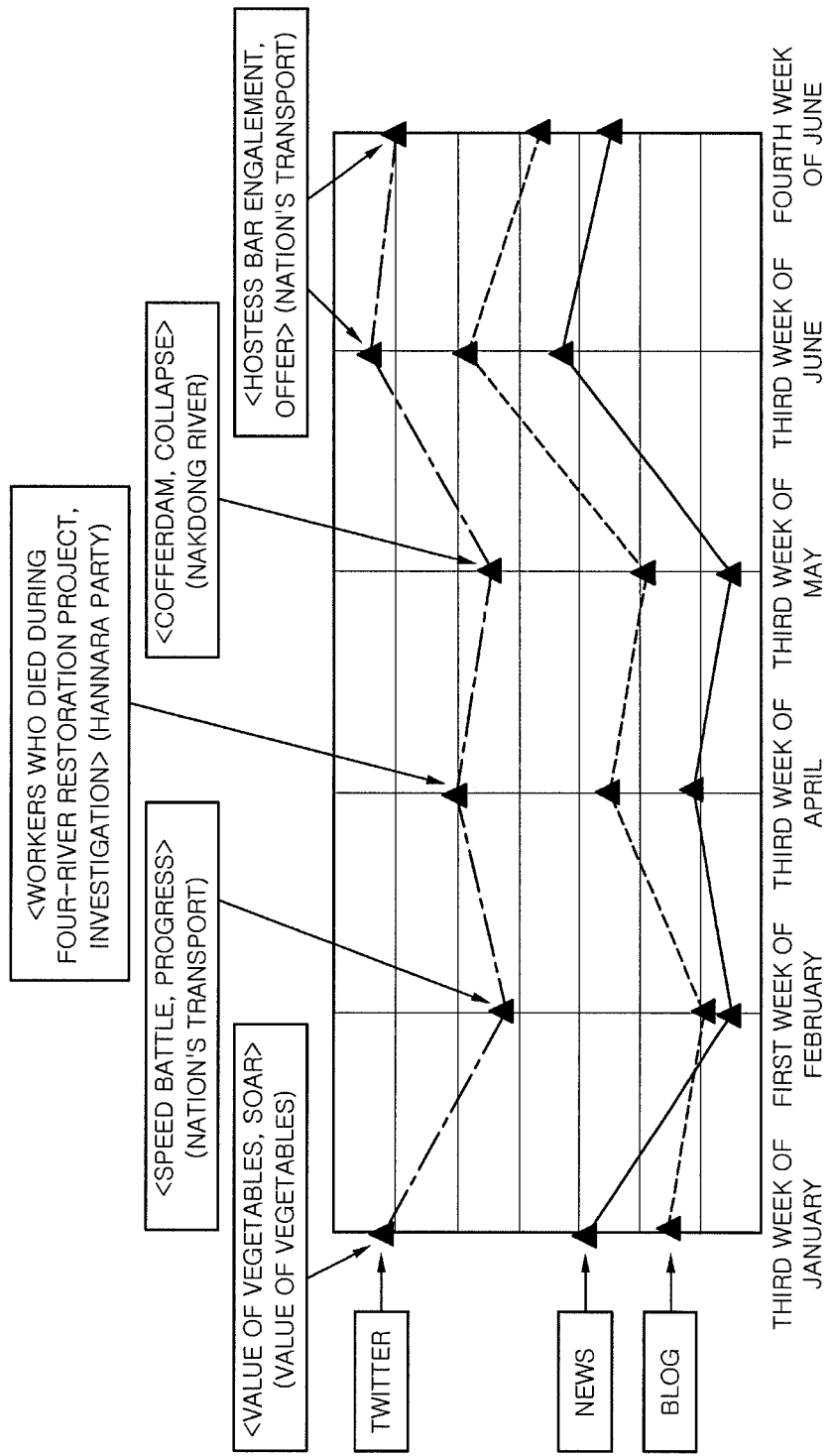
FIG. 9 is a view illustrating the UI output result provided by the related topic presenting unit of FIG. 8.

The related topic presenting unit 1310 displays effectively the topics that become most issues by date through the UI based on the ranking results by date obtained by the topic ranking unit 1308. For example, FIG. 9 illustrates the output result, a related topic UI, provided by the related topic presenting unit 1310 by way of example.

In accordance with the embodiment as described above, related topics and competition topics for a specific topic are automatically found and displayed through an effective UI in comparison with each other, thereby correctly and minutely analyzing the specific topic, unlike in the conventional method of only searching and managing information on the specific topic. In accordance with the embodiment, the user may be automatically provided with detailed and correct analysis results on topics that recently become issues to rapidly and correctly cope with a problem. In addition, the embodiment may be applied to constant monitoring so that it is possible to solve a problem in advance before the specific topic becomes a serious issue.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A system for detecting related topics and competition topics for a target topic, the system comprising:
at least one computer hardware to implement:
an extractor configured to create topic templates and association words from documents created online to generate topic templates and association words; and
a detector configured to detect and trace related topics and competition topics for the target topic based on the topic templates for the target topic, the topic templates for the competition topics, and the association words,
wherein the competition topics are topics which compete with the target topic,
wherein the related topics are displayed depending on time and importance, and
wherein the related topics are topics that become issues among the association words of the target topic and ranked according to a degree of becoming issues.

2. The system of claim 1, wherein the extractor comprises:
a language analyzer configured to perform a language analysis on the documents through analyzing morphemes and recognizing named-entities;
a topic template extractor configured to extract topics from the documents to generate the topic templates for the topics using the language analyzed results;
a topic ranker configured to measure frequencies, importance, and reliabilities of the topics to rank the topics; and
an association word extractor configured to measure the degrees of association among keywords within the topics to extract the association words with highly associated keywords based on the measured degrees of relation.

3. The system of claim 1, wherein the documents comprise at least one of news, blogs, and social network services (SNS).

4. An apparatus for detecting and tracing related topics and competition topics for a target topic, the apparatus comprising:
at least one computer hardware to implement:
a first detector configured to recognize a type of the target topic to detect and trace related topics appropriate to the target topic based on the properties of topic templates;
a second detector configured to filter and rank association words of the target topic based on the properties of the topic templates, to extract competition topics in competition with the target topic, and search the topic templates for the extracted competition topics and the topic templates for the target topic to provide topic tracing results; and
a third detector configured to rank topics that are related to the target topic and that become issues among the association words of the target topic,
wherein the related topics are displayed depending on time and importance.

5. The apparatus of claim 4, wherein the first detector comprises:
a topic type recognizer configured to select the type of the target topic as one of preset topic types;
a topic type core property selector configured to select a core property of the target topic depending on the topic type selected by the topic type recognizer; and
a related topic searcher configured to search topic templates based on the core property selected by the topic type core property selector and the target topic to find the related topics to the target topic.

6. The apparatus of claim 5, wherein the core property is selected using a preset rule or mechanical learning technique.

7. The apparatus of claim 4, wherein the second detector comprises:
an association word searcher configured to search association words of the target topic for documents created online;
an association word filter configured to filter out topics that are different from the competition topics of the target topic among the searched association words by the association word searcher;
a competition topic ranker configured to rank the association words filtered by the association word filter using frequency and source reliability measurements to select a first ranked competition topic;
a competition topic searcher configured to search the topic templates to find related topics to the first ranked competition topic;

a target topic searcher configured to search the topic templates to find related topics to the target topic; and a topic tracer configured to providing the related topics searched by the competition topic searcher and the related topics searched by the target topic searcher through a user interface.

8. The apparatus of claim 7, wherein the association word filter filters out topics that are different from the competition topics in consideration of topic template property values of the topic template or named-entity tags based on preset removing rule rules.

9. The apparatus of claim 4, wherein the third detector comprises:

an association word searcher configured to searching association words of the target topic;

an association word based topic template searcher configured to searching association words and related topics based on the search results of the association word searcher;

a target topic based filter configured to removing topics that are not related to the target topic from among the search results of the association word based topic template searcher;

a topic ranker configured to measuring degrees of being issues for topics left after being filtered by the target topic based filter to rank the topics by date; and a related topic presenter configured to provide topics that become issues through a user interface based on ranking results by date that are obtained by the topic ranker.

10. The apparatus of claim 9, wherein the target topic based filter removes topics that are not related to the target topic based on the association word and the property values of the topic templates.

11. A method for detecting and tracing related topics and competition topics for a target topic, which is executed by a processor to control one or more processor-executable units, the method comprising:

recognizing, by a processor, a type of the target topic to detect and trace related topics appropriate to the target topic based on the properties of topic templates;

filtering association words of the target topic based on the properties of the topic templates to extract competition topics of the target topic;

searching the topic templates for the extracted competition topics and topic templates for the target topic to provide topic tracing results; and ranking topics that are related to the target topic and that become issues among the association words of the target topic, wherein the competition topics are topics which compete with the target topic, wherein the related topics are displayed depending on time and importance.

12. The method of claim 11, wherein said recognizing of the type of the target topic comprises:

selecting the type of the target topic as one of preset topic types;

selecting a core property of the target topic depending on the selected topic type; and searching the topic templates to find related topics to the target topic based on the selected core property and the target topic.

13. The method of claim 12, wherein said searching of the topic templates comprises:

searching all topic templates having the same names as the target topic;

eliminating topic templates whose core properties do not have property values;

ranking the property values to select upper N-number of property values;

eliminating topic templates except the topic templates having the upper N-number of property values; and grouping the topic templates based on the upper N-number of property values.

14. The method of claim 12, wherein said selecting of the core property of the target topic comprises selecting the core property by a preset rule or mechanical learning technique.

15. The method of claim 11, wherein said searching of all the topic templates comprises:

searching association words of the target topic;

filtering out topics that are not included in the competition topics of the target topic from among the association word search results;

ranking the filtered association words using frequency and source reliability measurements to select a first ranked competition topic;

searching the topic templates to find related topics to the first ranked competition topic;

searching the topic templates to find related topics to the target topic; and providing search results for the first ranked competition topic and search results for the target topic through a user interface.

16. The method of claim 15, wherein said filtering out of the topics that are not included in the competition topics of the target topic comprises removing topics that are different from the competition topics in consideration of property values of the topic template or named-entity tags based on preset removing rules.

17. The method of claim 16, wherein the preset removing rules are implemented to:

remove association words whose named-entity tags are different from the target topic based on the named-entity tags;

select a filtering property by the type of the target topic to choose a property to be filtered in dependence on the type of the target topic; search the topic templates for the association words; and remove association words whose filtering property values are the same as the filtering property value of the target topic.

18. The method of claim 11, wherein said ranking of the topics comprises:

searching association words of the target topic;

searching related topics to the association words;

filtering out topics that are not related to the target topic from among the searched association words;

measuring degrees of being issues for the filtered topics to rank the filtered topics by date; and providing the topics through a user interface based on ranking results obtained by date.

19. The method of claim 18, wherein said filtering out of the topics comprises removing the topics that are not related to the target topic based on the association words and the property value of the topic templates.

* * * * *